United States Patent [19]

Miyoshi

[11] Patent Number: 4,830,130
[45] Date of Patent: May 16, 1989

[54] POWER STEERING SYSTEM

[75] Inventor: Makoto Miyoshi, Kanagawa, Japan

[73] Assignee: Nissan Motor Company, Limited, Yokohama, Japan

[21] Appl. No.: 55,149

[22] Filed: May 28, 1987

[30] Foreign Application Priority Data

Jun. 9, 1986 [JP] Japan .............................. 61-88334[U]

[51] Int. Cl.⁴ .......................... B62D 5/06; B62D 5/08
[52] U.S. Cl. ...................................... 180/141; 91/371;
91/372; 91/420; 180/143
[58] Field of Search .................. 180/132, 141, 143, 79,
180/142; 91/370, 371, 372, 400, 401, 404, 420

[56] References Cited

U.S. PATENT DOCUMENTS

| | | | |
|---|---|---|---|
| 4,438,827 | 3/1984 | Lang | 180/143 |
| 4,463,819 | 8/1984 | Becker | 180/132 |
| 4,665,798 | 5/1987 | Bacardit | 180/132 |

FOREIGN PATENT DOCUMENTS 2341207 2/1975 Fed. Rep. of Germany ...... 180/132
49-120330 11/1974 Japan .
WO86/2053 4/1986 World Int. Prop. O. .......... 180/141

Primary Examiner—Charles A. Marmor
Assistant Examiner—Everett G. Diedriks, Jr.
Attorney, Agent, or Firm—Foley & Lardner, Schwartz, Jeffery, Schwaab, Mack, Blumenthal & Evans

[57] ABSTRACT

A power steering system for automotive vehicles includes devices for decreasing reaction force and for increasing assisting force applied to the steering wheel in cases where steering operation is performed while the vehicle is stopped. The device comprises a cut-off valve and a bias spring biasing the cut-off valve upwardly. The area of the upper surface of the cut-off valve is larger than that of the lower surface thereof. Therefore, the cut-off valve can move downwardly against the biasing force of the bias spring to block fluid communication between a fluid pressure source and chambers of a power cylinder when fluid pressure exceeding a predetermined value is applied to the upper and lower surfaces of the cut-off valve.

21 Claims, 1 Drawing Sheet

POWER STEERING SYSTEM

BACKGROUND OF THE INVENTION

1. (FIELD OF THE INVENTION)

The present invention relates to a power steering system which can make it easy to operate the steering wheel of an automotive vehicle. More specifically, the invention relates to a power steering system including a reaction means for applying a reaction force to the steering wheel of the vehicle so as to react steering operation in accordance with vehicle driving conditions.

2. (DESCRIPTION OF THE PRIOR ART)

A power steering system is described in the Japanese Patent First Publication (Tokkai) Showa No. 49-120330. This power steering system includes means for reducing the manual steering force and a reaction means for applying a reaction force to the steering wheel of a vehicle. The reaction means comprises two reaction chambers. The means for reducing the manual steering force comprises a control valve and a spool valve housed in the control valve, a power cylinder which can be in communication with the control valve, and an actuating pin mounted on the spool valve. When the driver operates the steering wheel, the spool valve is caused to move, by means of the actuating pin, in one of axial directions. As a result, a port formed on the control valve is in communication with an annular groove provided on the spool valve so that high-pressure working fluid is supplied from a working-fluid tank to one of chambers of the control valve. As a result, an assisting force is generated to reduce the manual steering force which must be applied by the driver. In addition, a part of the working fluid is supplied to one of the reaction chambers to restrict displacememt of the spool valve. On the other hand, the working fluid in the other reaction chamber is drained to the tank by means of a variable orifice. In the case of steering operations performed while the vehicle is stopped, the variable orifice opens fully by means of a spring to decrease the fluid pressure in the reaction chambers. Conversely, in the case of steering operations performed when the vehicle is traveling, the opening of the variable orifice is decreasing as the vehicle speed is increasing to increase the fluid pressure in the reaction chambers.

However, in the aforementioned power steering system, the quantity of the working fluid drained to the tank is increased as the pressure in the system increases and an assisting force enough to sufficiently decrease the manual steering force can not be generated. In order to compensate sufficient quantity of working fluid supplied to the power cylinder, the capacity of the pump must be enlarged. Therefore, there is a disadvantage in that the power steering system becomes large, heavy and expensive.

SUMMARY OF THE INVENTION

It is therefore a principle object of the present invention to eliminate aforementioned disadvantage and to provide a power steering system for automotive vehicles, which can provide easy operation of the steering wheel even if the steering wheel is operated while the vehicle is stopped.

In order to accomplish the aforementioned and other specific objects, a power steering system for automotive vehicles, according to the present invention, includes means for reducing the reaction force and for increasing the assisting force applied to the steering wheel. The means comprises a cut-off valve and a bias spring biasing the cut-off valve upwardly. The area of the upper surface of the cut-off valve is larger than that of the lower surface thereof and the cut-off valve moves downwardly against the biasing force of the bias spring so as to block fluid communication between a fluid pressure source and chambers of a power cylinder when fluid pressure exceeding a predetermined value is applied to the upper and lower surfaces of the cut-off valve.

According to one aspect of the present invention, a power steering system for automotive vehicles comprises:

first hydraulic means, responsive to steering operation through a manually operable steering wheel, for generating a first hydraulic force acting as an assisting force for operating an automotive steering mechanism to an angular position corresponding to the angle of said steering wheel displacement;

second hydraulic means, cooperative with said first hydraulic means, for generating second hydraulic force acting as a reaction force reacting against angular displacement of said steering wheel, said second hydraulic means including a reaction control means for adjusting said second hydraulic force for varying the magnitude of said reaction force depending upon the vehicle driving condition;

a common hydraulic pressure source means, cooperating with said first and second hydraulic means, for building up said first and second hydraulic force; and third means, responsive to load on said hydraulic pressure source means, for disconnecting said hydraulic pressure source means from said second hydraulic means when said load on said hydraulic pressure source means becomes greater than a given value.

The first hydraulic means preferably includes a power cylinder having opposing two fluid chambers and a pressure control means having a hollow control valve and a spool valve received within the control valve. The spool valve is free to move axially and is associated with the control valve for selectively establishing or blocking fluid communication between the chambers of the power cylinder and the hydraulic pressure source means.

The second hydraulic means preferably includes first and second reaction chambers, both filled with the working fluid, which are connected to both end of the spool valve so as to restrict the axial displacement of the spool valve.

The reaction control means can adjust the quantity of the working fluid to be drained form the reaction chambers in accordance with the vehicle speed.

The third means may block fluid communication between the hydraulic pressure source means and the first and second reaction chambers in the case of steering operations performed while the vehicle is stopped so as to generate sufficient assisting force. The third means preferably comprises a cut-off valve and a bias spring. The area of the upper surface of the cut-off valve is larger than the area of the lower surface thereof so that the cut-off valve can move downwardly against the biasing force of the bias spring to block fluid communication between the hydraulic pressure source means and the first and second reaction chambers when fluid pressure exceeding a predetermined value is applied to the upper and lower surfaces of the cut-off valve.

The power steering system may further include a fixed orifice restricting the fluid pressure applied to the reaction chambers.

The first hydraulic means may also include a rotary valve.

DESCRIPTION OF THE PREFERRED EMBODIMENT

Figure 1:
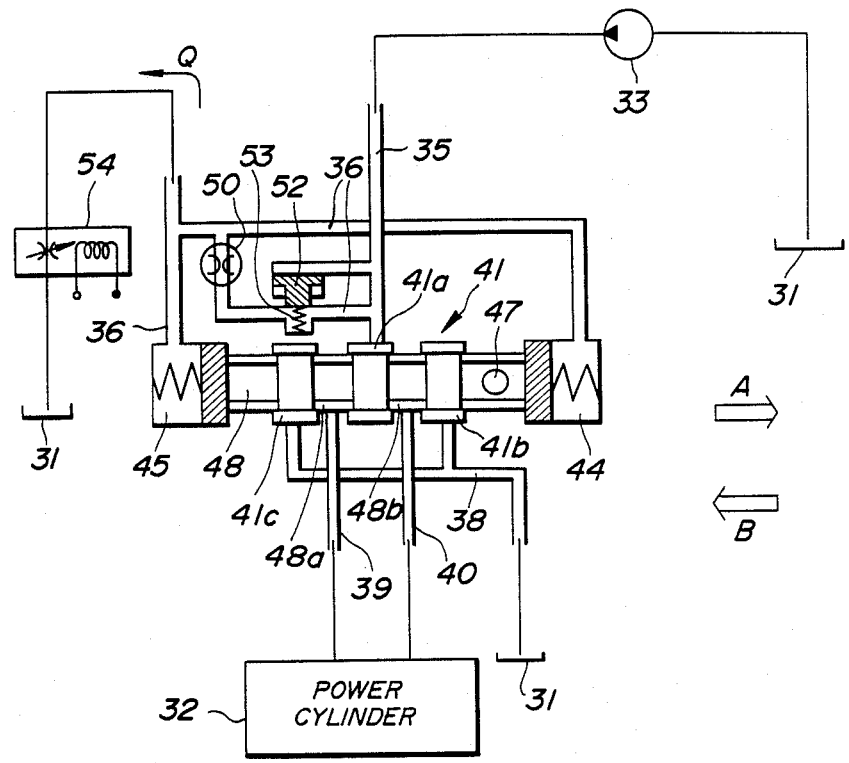
FIG. 1 is a schematic diagram of the preferred embodiment of a power steering system according to the present invention.

Referring now to the drawings, particularly to FIG. 1, the preferred embodiment of a power steering system, according to the present invention, includes a pump 33 connected to a working-fluid tank 31 which is filled with a working fluid. The pump 33 is in communication with an inlet port 41a of a control valve 41 via a supply line 35. The control valve 41 has outlet ports 41b and 41c on both sides of the inlet port 41a. The outlet ports 41b and 41c are in communication with the working-fluid tank 31 via a branching drain line 38. A spool valve 48 is housed in the control valve 41. An actuating pin 47, which is associated with a steering wheel, not shown, is mounted on the spool valve 48. The spool valve 48 is moved axially by means of the actuating pin 47. The spool valve 48 has three lands spaced at regular intervals so as to define two annular grooves 48a and 48b. The annular groove 48a of the spool valve 48 is in communication with one chamber of a power cylinder 32 via a supply line 39. The annular groove 48b of the spool valve 48 is in communication with the other chamber of the power cylinder 32 via a supply line 40. Opposing reaction chambers 44 and 45 are provided on opposite ends of the spool valve 48 of the control valve 41. The reaction chambers 44 and 45 are in communication with the supply line 35 via a branching pressure line 36 so that the working fluid can be supplied to the reaction chamber 44 and 45. A fixed orifice 50 is provided on the branching pressure line 36 at a location between the reaction chambers 44 and 45 and the supply line 35. In addition, a cut-off valve 52 is provided on the branching pressure line 36 at a location between the fixed orifice 50 and the supply line 35. A bias spring 53 is provided on the lower end of the cut-off valve 52 so as to bias the cut-off valve 52 upwards. The upper end of the cut-off valve 52 is communicated with the supply line 35 at a location between the working-fluid pump 33 and the junction of the supply line 35 and the branching pressure line 36. The reaction chambers 44 and 45 are in communication with the working-fluid tank 31 via the branching pressure line 36 so that the working fluid in the reaction chambers 44 and 45 can be drained to the working-fluid tank 31. A bias spring is provided in each of the reaction chambers 44 and 45 so as to bias the spool valve 48 inwardly. A reaction control means 54 is provided between the reaction chambers 44 and 45 and the working-fluid tank 31. The reaction control means 54 can control the quantity of the working fluid, which is to be drained from the reaction chambers 44 and 45, according to the vehicle speed. That is, the reaction control means 54 is designed to decrease the quantity Q drained when the vehicle speed increases and to increase the quantity Q drained when the vehicle speed decreases.

Figure 2:
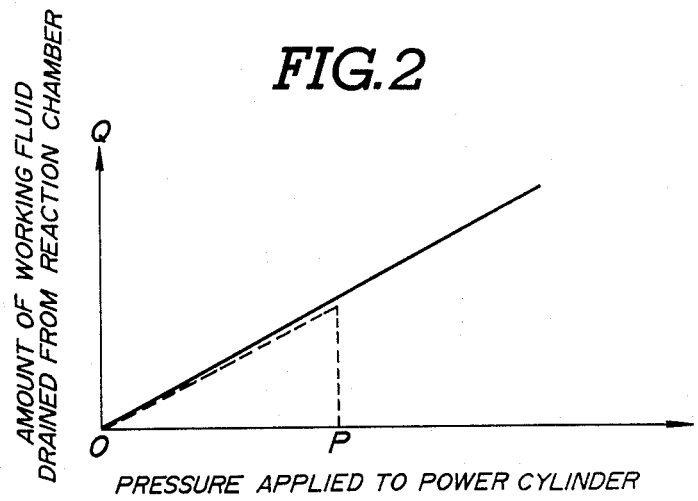
FIG. 2 is a graph showing the quantity of a working fluid drained from the reaction chamber in FIG. 1 relative to the load pressure of the power cylinder used in the power steering system in FIG. 1.

In the aforementioned construction, the pump 33 sucks up the working fluid in the working-fluid tank 31 and supplies it to the supply line 35. The working fluid is supplied to the inlet port 41a of the control valve 41 via the supply line 35. When the driver operates the steering wheel, the spool valve 48 of the control valve 41 is moved, by means of the actuating pin 47, toward the arrow A in FIG. 1 so that the inlet port 41a is communication with the annular groove 48a. As a result, the working fluid is supplied to one chamber of the power cylinder via supply line 39. In addition, the annular groove 48b of the control valve 41 is in communication with the outlet port 41b, so that the working fluid in the other chamber of the power cylinder is drained to the working-fluid tank 31 via supply line 40 and the branching drain line 38. At this time, a differential pressure occurs between the opposing chambers of the power cylinder so that a piston, not shown, which is provided between the opposing chambers of the power cylinder, is caused to move. The power cylinder can produce assisting force by means of the piston so as to reduce manual steering force which must be applied by the driver. In this case, a part of the working fluid, which is supplied from the pump 33 to pass through the supply line 35, is supplied to the branching pressure line 36. The working fluid supplied to the branching pressure line 36 is supplied to the reaction chambers 44 and 45 after the fluid pressure in the branching pressure line 36 is controlled by means of the fixed orifice 50. As a result, reaction force is generated so as to restrict the axial displacement of the spool valve 48 of the control valve 41. The working fluid in the reaction chambers 44 and 45 can be drained into the working-fluid tank 31 via the branching pressure line 36. The quantity of the working fluid drained via the branching pressure line 36 is controlled by means of the reaction control means 54 in accordance with the vehicle speed. That is, as the vehicle speed is increased, the quantity of the working fluid drained to the working-fluid tank 31 is decreased so as to increase the reaction force in the reaction chambers 44 and 45. Therefore, assisting force can decrease to improve driving stability while the vehicle is driven at a high speed. Conversely, when the vehicle is driven at a low speed, the load pressure applied to the power cylinder increases and the quantity of working fluid drained to the working-fluid tank 31 increases as shown in FIG. 2 so as to decrease the reaction force in the reaction chambers 44 and 45. Therefore, the assisting force can increase to improve steering operation.

In addition, when the load pressure applied to the power cylinder exceeds a predetermined value, such as the case of steering operations performed while the vehicle is stopped, the fluid pressure in the supply line 35 also exceeds a predetermined value. In the preferred embodiment of a power steering system according to the invention, when this fluid pressure exceeding a predetermined value is applied to the upper and lower surface of the cut-off valve 52, the cut-off valve 52 moves downwardly against the biasing force of the spring 53 to shut off the branching pressure line 36 since the area of the upper surface of the cut-off valve 52 is larger than that of the lower surface thereof. As a result, no working fluid is supplied to the working-fluid tank 31 and all of the working fluid can be supplied to the power cylinder so as to generate an adequate assisting force. Therefore, a sufficient quantity of the working fluid can be supplied to the power cylinder without using a larger pump 33 so that more compact, inexpensive power steering systems can be provided.

On the other hand, when the driver operates the steering wheel and the spool valve 48 of the control valve 41 is moved, by means of the actuating pin 47, in the direction of the arrow B in FIG. 1, the inlet port 41a is communicated with the annular groove 48b. As a result, the working fluid is supplied to one chamber of the power cylinder via supply line 40. In addition, the annular groove 48a of the control valve 41 is in communication with the outlet port 41c, so that the working fluid in the other chamber of the power cylinder is drained to the working-fluid tank 31 via supply line 39 and the branching drain line 38. At this time, a differential pressure generates between the opposing chambers of the power cylinder so that the piston is caused to move. The power cylinder can produce assisting force by means of the piston so as to reduce the manual steering force. In addition, in the case of steering operations performed while the vehicle is stopped, the cut-off valve 52 can shut off the branching pressure line 36 so as to produce sufficient assisting force.

Furthermore, although a cut-off valve is provided between the fixed orifice 50 and the supply line 35 according to the aforementioned preferred embodiment of a power steering system of the invention, it can also be provided between the fixed orifice 50 and the reaction chambers 44 and 45. In addition, a rotary valve may also be used as the control valve in a power steering system according to the invention.

What is claimed is:

1. A power steering system comprising:
   first hydraulic means including a valve responsive to steering operation through a manually operable steering wheel, for generating a first hydraulic force acting as an assisting force for operating an automotive steering mechanism to an angular position corresponding to the angle of said steering wheel displacement;
   second hydraulic means including first and second reaction chambers, interconnected by a branching line, acting on said valve, cooperative with said first hydraulic means, for generating second hydraulic force acting as a reaction force reacting against angular displacement of said steering wheel, said second hydraulic means including a reaction control means for adjusting said second hydraulic force for varying the magnitude of said reaction force and supplying hydraulic fluid from a tank to said valve through a supply line depending upon a vehicle driving condition;
   a common hydraulic pressure source means, cooperated with said first and second hydraulic means, for building up said first and second hydraulic force; and
   third means, responsive to load on said hydraulic pressure source means, for disconnecting said hydraulic pressure source means from said second hydraulic means when said load on said hydraulic pressure source means becomes greater than a given value;
   wherein said second hydraulic means is located in a drainage line connecting said branching line and said tank, and said third means is located between said supply line and said branching line.

2. A power steering system as set forth in claim 1, wherein said first hydraulic means includes a power cylinder having a first and second fluid chamber, both filled with a working fluid.

3. A power steering system as set forth in claim 2, wherein said first hydraulic means includes a pressure control means.

4. A power steering system as set forth in claim 3, wherein said pressure control means includes a hollow control valve and a spool valve received within said hollow control valve, said spool valve being free to move axially and associate with said control valve for selectively establishing or blocking fluid communication between said first and second fluid chambers and said common hydraulic pressure source means.

5. A power steering system as set forth in claim 4, wherein said second hydraulic means includes first and second reaction chambers, both filled with the working fluid.

6. A power steering system as set forth in claim 5, wherein said reaction chambers are connected to both ends of said spool valve so as to react the axial displacement of said spool valve.

7. A power steering system as set forth in claim 6, wherein said third means disconnects said hydraulic pressure source means from said second hydraulic means between said fluid pressure source and said first hydraulic means and in cases where steering operation is performed while the vehicle stops so as to produce sufficient assisting force.

8. A power steering system as set forth in claim 1, wherein said reaction control means adjusts said second hydraulic pressure for varying the magnitude of said reaction force depending upon the vehicle speed.

9. A power steering system as set forth in claim 8, wherein said first hydraulic means includes a power cylinder having a first and second fluid chamber, both filled with a working fluid.

10. A power steering system as set forth in claim 9, wherein said first hydraulic means includes a pressure control means.

11. A power steering system as set forth in claim 10, wherein said pressure control means includes a hollow control valve and a spool valve received within said hollow control valve, said spool valve being free to move axially and associate with said control valve for selectively establishing or blocking fluid communication between said first and second fluid chambers and said common hydraulic pressure source means.

12. A power steering system as set forth in claim 11, wherein said second hydraulic means includes first and second reaction chambers, both filled with the working fluid.

13. A power steering system as set forth in claim 12, wherein said reaction chambers are connected to both ends of said spool valve so as to react the axial displacement of said spool valve.

14. A power steering system as set forth in claim 13, wherein said third means disconnects said hydraulic pressure source means from said second hydraulic means between said fluid pressure source and said first and in cases where steering operation is performed while the vehicle stops so as to produce sufficient assisting force.

15. A power steering system as set forth in claim 1, wherein said third means includes a cut-off valve and a bias spring biasing said cut-off valve upwardly.

16. A power steering system as set forth in claim 15, wherein the area of the upper surface of said cut-off valve is larger than the area of the lower surface thereof and wherein said cut-off valve moves downwardly against the biasing force of said bias spring to block fluid communication between said fluid pressure source and said first and second reaction chambers when fluid pressure exceeding a predetermined value is applied to the upper and lower surfaces of said cut-off valve.

17. A power steering system as set forth in claim 1, further comprising a fixed orifice restricting the fluid pressure applied to said reaction chambers.

18. A power steering system as set forth in claim 1, wherein said vehicle driving condition is vehicle speed and in response to vehicle speed being increased, said reaction force is increased and said assisting force is decreased and, in response to vehicle speed being decreased, said reaction force is decreased and said assisting force is increased.

19. A power steering system as set forth in claim 1, wherein said first hydraulic means includes a power cylinder having a first and second fluid chamber, both filled with a working fluid.

20. A power steering system as set forth in claim 19, wherein said first and second reaction chambers are both filled with the working fluid.

21. A power steering system as set forth in claim 20, wherein said third means disconnects said hydraulic pressure source means from said second hydraulic means between said fluid pressure source and said first hydraulic means and second reaction chambers in cases where steering operation is performed vehicle stops so as to produce sufficient assisting force.

* * * * *